(12) United States Patent
Nayyer et al.

(10) Patent No.: US 10,816,871 B1
(45) Date of Patent: Oct. 27, 2020

(54) FAST SPATIAL LIGHT SWITCHES AND THEIR FABRICATION

(71) Applicants: Jamshid Nayyer, Richmond Hill (CA); Vida Ravanmehr, West Hartford, CT (US)

(72) Inventors: Jamshid Nayyer, Richmond Hill (CA); Vida Ravanmehr, West Hartford, CT (US)

( * ) Notice: Subject to any disclaimer, the term of this patent is extended or adjusted under 35 U.S.C. 154(b) by 185 days.

(21) Appl. No.: 16/048,128

(22) Filed: Jul. 27, 2018

Related U.S. Application Data

(60) Provisional application No. 62/604,995, filed on Jul. 31, 2017.

(51) Int. Cl.
*G02B 26/08* (2006.01)
*G02F 1/29* (2006.01)
(Continued)

(52) U.S. Cl.
CPC ............ *G02F 1/31* (2013.01); *G02F 2202/20* (2013.01)

(58) Field of Classification Search
CPC ......... G02F 1/134363; G02F 1/134309; G02F 2001/134381; G02F 1/29; G02F 1/1368; G02F 2001/294; G02F 1/13624; G02F 1/134372; G02F 1/133528; G02F 1/13439; G02F 1/292; G02F 1/133707; G02F 1/134336; G02F 2001/134345; G02F 1/133345; G02F 1/1337; G02F 1/13471; G02F 1/136209; G02F 1/1334; G02F 1/133621; G02F 1/133753; G02F 1/13454; G02F 1/13458; G02F 1/136286; G02F 1/139; G02F 1/1393; G02F 2001/133622; G02F 2001/133761; G02F 2001/13629; G02F 2203/50; G02F 1/1313;
(Continued)

(56) References Cited

U.S. PATENT DOCUMENTS 4,387,343 A * 6/1983 Kondo ................ G02F 1/0316
359/254
5,369,718 A 11/1994 Kamata
(Continued)

OTHER PUBLICATIONS

J. Nayyer et al, Analysis of Reflection Type Optical Switches With Intersecting Waveguides, Journal of Lightwave Technology, vol. 6, No. 6, pp. 1146-1152, Jun. 1988.
(Continued)

*Primary Examiner* — Brandi N Thomas
(74) *Attorney, Agent, or Firm* — Mark Clodfelter

(57) ABSTRACT

Using two uniaxial optical crystals of trigonal 3 m symmetry, and with their optical axes aligned perpendicular to each other, a fast spatial light switch is disclosed based on changing the refractive index and optical axes of one of the crystals using Pockels effect. The first crystal in which Pockels effect is induced has electrodes along top and bottom sides. The interface between the crystals is at an angle such that the beam of light is totally reflected out of the first crystal. When an electric field is impressed through the first crystal, its refractive indices and crystal axes are altered such that the interface becomes transmissive, with the beam exiting from the second crystal. Spatial separation of Transmissive and Reflective States provides >50 dB of Cross-talk and Extinction ratios.

11 Claims, 7 Drawing Sheets

(51) Int. Cl.
*G02B 26/00* (2006.01)
*G02F 1/31* (2006.01)

(58) Field of Classification Search
CPC ............... G02F 1/133; G02F 1/133555; G02F 1/133788; G02F 1/1345; G02F 1/1347; G02F 1/13718; G02B 30/27; G02B 30/00; G02B 2006/12142; G02B 2006/12145; G02B 6/12011; G02B 6/12023; G02B 30/25; G02B 26/004; G02B 26/085; G02B 26/101; G02B 27/104; G02B 27/145; G02B 3/14; G02B 5/0236; G02B 5/0263; G02B 5/0289; G02B 6/001; G02B 6/005; G02B 6/0066; G02B 1/00; G02B 2027/0127; G02B 27/0172; G02B 30/24; G02B 30/26; G02B 30/36; G02B 5/1833; G02B 5/1842; G02B 5/1876; G02B 5/30; G02B 6/0035; G02B 6/0073; G02B 6/12; G02B 6/122; G02B 6/03
USPC ......... 359/237, 245, 254–255, 291–292, 295
See application file for complete search history.

(56) References Cited

U.S. PATENT DOCUMENTS

| | | | |
|---|---|---|---|
| 6,064,787 | A | 5/2000 | Castoldi |
| 6,542,268 | B1 | 4/2003 | Rotolo |
| 6,633,692 | B2 | 10/2003 | Chua |
| 8,131,124 | B2 | 3/2012 | Nayyer |
| 9,207,403 | B2 | 12/2015 | Kim |

OTHER PUBLICATIONS

B. Li et al, Reflection Type Optical Waveguide Switch With Bow Tie Electrode, Journal of Lightwave Technology, vol. 20 No. 1, pp. 65-70, Jan. 2002.
B. E. A. Saleh et al, Fundamentals of Photonics, John Wiley and Sons Inc. 1991.
Helmut K.V. Letsch, Reflection and Refraction of a Beam of Light at a Plane Interface Journal of the Optical Society of America, vol. 58, 4, pp. 551-561, 1968.
Senarmont Prism, Wikipedia.

* cited by examiner

FAST SPATIAL LIGHT SWITCHES AND THEIR FABRICATION

CROSS REFERENCE TO RELATED APPLICATIONS

This application claims the benefit of Applicants' provisional application No. 62/604,995, filed Jul. 31, 2017.

FIELD OF THE INVENTION

This invention is generally related to spatial light switches, and particularly to fast light switches wherein light beams are switched rapidly between the two Reflection and Transmission states. Lithium Niobate is used as the uniaxial crystal of trigonal 3 m symmetry requiring electric field application of ~5V/μm in spatial switching of light beams.

BACKGROUND OF THE INVENTION

Initially, two physical phenomena are explained to facilitate an understanding of the instant invention. First, there is an optical concept known as the "critical angle". The critical angle is the angle of incidence for which the angle of refraction is 90°, as measured with respect to the normal at the refractive boundary between two materials through which a beam of light can pass. The so called "critical angle" exists if and only if a beam of light striking the boundary is in a medium of larger refractive index compared to the refractive index of the material to the other side. If the angle of incidence of light striking onto a boundary exceeds the critical angle, the incident light can not pass through the boundary and is reflected back in the material. Under these circumstances, the angle of incident light and the angle of reflected light both measured with respect to the normal to the boundary, are equal. This is "total reflection" of light. In case of a boundary between a material and air, since the refractive index of the material is larger than that of the air on the other side of the boundary, if the angle of incidence of light with respect to the normal to the boundary inside the material is greater than the critical angle, the light beam cannot pass through and is totally reflected back within the material.

Second, there exists a class of materials that exhibit an electro-optic effect. This effect is a change in the optical properties of a material such as refractive indices and principal axes in response to an applied electric field. Specifically, this Application is concerned with Pockels effect, in which a refractive index change occurs in an electro-optic material when an electric field is applied to that material. The Pockels effect is proportional to the strength of the applied electric field, and is exhibited by some crystalline solids. Lithium based crystals, such as Lithium Niobate and Lithium Tantalate are commonly used, as examples of electro-optic crystals showing Pockels effect.

Fast spatial switching of light has remained to be an active field of research during the past 2~3 decades. Various types of guided and unguided optical switches have been reported but to date, sufficiently fast spatial light switches capable of 100 GHz operation or above, have remained out of reach. In some prior art spatial switches using an electro-optic material responsive to Pockels effect, a part of the material of the switch is partially influenced by an applied electric field, and the remaining part is left uninfluenced by the electric field. This can easily be achieved by covering only a portion of the material with a pair of electrodes for application of an electric field and leaving the remaining portion uncovered. When an electric field is applied to the electrodes, a boundary is created between the portion influenced by the electric field and the portion uninfluenced by the electric field, where light undertakes total reflection when the light angle of incidence is larger than the critical angle corresponding to the refractive indices of both sides of the boundary, provided that light strikes onto the boundary from the side of the material of larger refractive index. In the absence of an electric field, that same incident light beam passes through both portions of the switch as there is no boundary. Materials such as Lithium Niobate, Semiconductors or the recently developed PLZT (Polycrystalline Lanthanum modified lead Zirconate Titanate), etc. are examples of such electro-optic materials that have refractive indices that can be changed by application of an electric field to induce Pockels activity, Quantum Stark or Plasma effects. Pockels effect is a fast phenomenon, making associated opto-electronic devices capable of fast operation speeds in excess of at least 100 GHz. The effect is, however, very weak, and the refractive index changes are only typically to a $2^{nd}$~$3^{rd}$ or even $4^{th}$ decimal point. That is why switches using Lithium Niobate and the like have all been physically long switches. Also, as the refractive index change effect is very weak, total reflection can be achieved only at very small grazing angles of an incident guided or an unguided beam of light. The spatial states become, therefore, hard to be physically separated, resulting in limited cross-talk and extinction ratio characteristics. If the extinction ratio and cross-talk of any spatial light switch are not sufficiently large, say better than 30 dB, the switch can hardly find any practical application.

Some prior art switches are based on thermo-optic, current injection or mechanical effects, and are incapable of responding to high repetition rates in the GHz range. In semiconductors, high absorption losses of the material is an impediment in their application in optical passive devices. Significantly, in prior art switches dealing with guided light, the polarization state of such prior art guided light switches remains constant. In the guided spatial light switch disclosed in U.S. Pat. No. 8,131,124, in order to achieve extinction ratios and cross-talks larger than about 30 dB, the guided light is required to propagate in waveguides of 0.01% refractive index difference. Fabrication of such very weakly guiding waveguides is not practically realizable and to date, the switch has remained out of reach.

Applicants propose a light switch based on polarization rotation of an incident linearly polarized light, in a deformed crystal due to the electric field application. The materials used in Applicants' spatial light switch are of anisotropic uniaxial crystals of trigonal 3 m symmetry type. The principal axes of these crystals are designated by x, y, z and used throughout this Application wherein the optical axis is taken along the z axis. Achieving superior switching characteristics of Applicants' switch indicates that polarization management of incident light is an effective method in its spatial switching. Polarization rotation in Applicants' switch is achieved in a deformed crystal with an applied electric field in the direction of its x axis, which is transverse to the direction of light propagation along its optical z axis. Therefore, electric field application leaves no disturbance to light propagation, allowing achievement of comparatively small driving electric fields.

Significantly, application of an electric field along the x axis of a uniaxial crystal of trigonal 3 m symmetry is newly proposed in this Application. In prior art optical devices using Lithium Niobate material such as in high speed modulators, an electric field is applied along the crystal's optical z axis wherein the direction of the crystal's principal axes remain unchanged. Application of an electric field along x direction of a uniaxial crystal of trigonal 3 m symmetry, as proposed by Applicants, changes the crystal's refractive indices as well as crystal principal axes, and causes the crystal principal axes to rotate by about 45 degrees in the transverse plane with respect to the direction of light propagation along z. This 45 degree rotation of the transverse crystal axes with respect to the direction of light propagation, is essential and is the basis of operation of the instant switch as elaborated later.

Figure 1A:
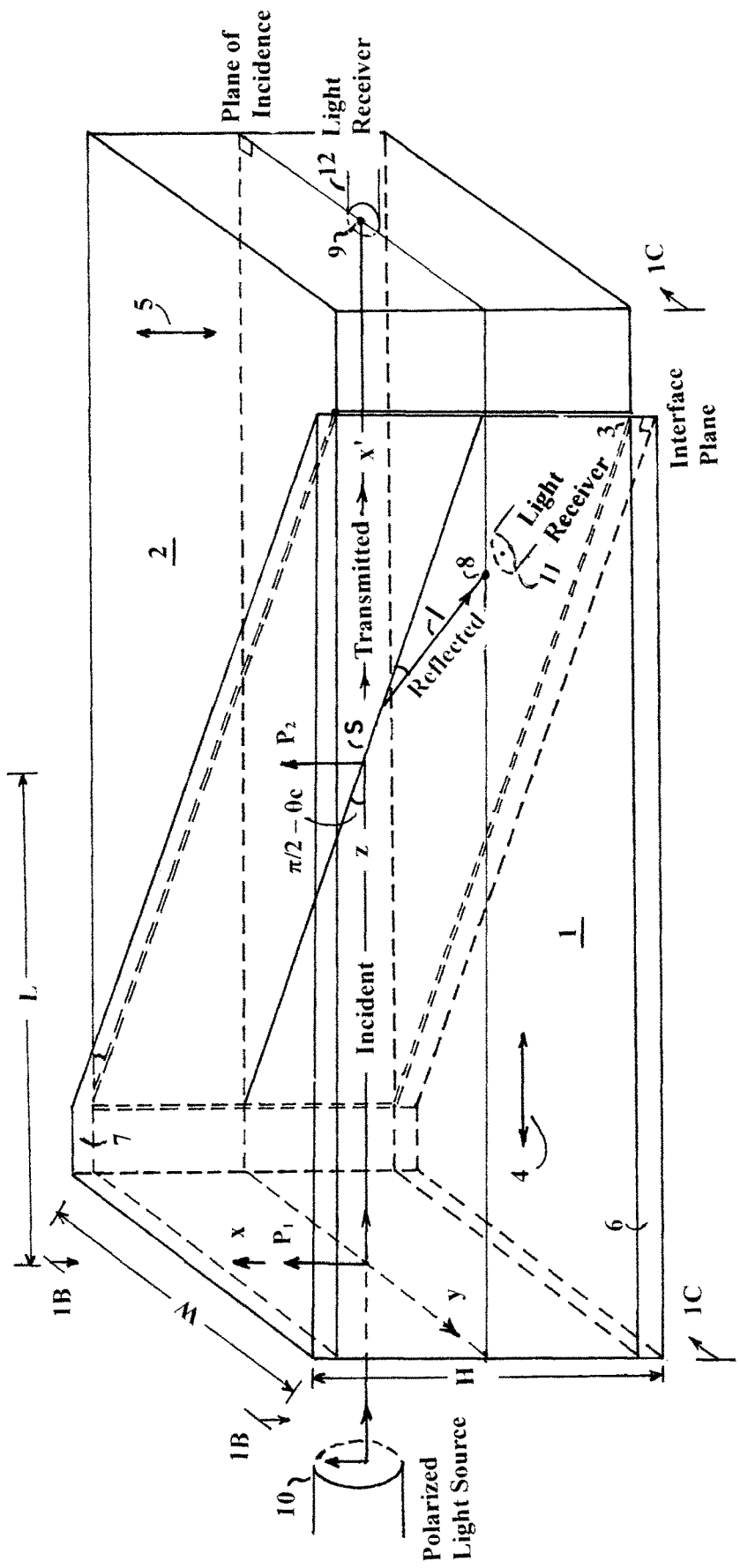
FIG. 1A is a perspective view of a light switch of the instant invention.

The angles shown in the drawings are for illustrative purposes only and may not be accurate representations of correct angles disclosed in the specification.

DETAILED DESCRIPTION OF THE DRAWINGS

The instant invention provides a fast spatial light switch using first and second anisotropic uniaxial crystals of trigonal 3 m symmetry. The crystals are optically bonded together with their optical axes (z axes) perpendicular to each other. The interface or boundary plane between the two crystals is made to be inclined, as if it is the result of a rotation of the cross section of the two crystals about an axis in the direction of the incident light polarization, located in the middle of the boundary plane. The rotation is such that an angle between the boundary plane and the direction of light propagation equal to or slightly larger than the critical angle corresponding to the two refractive indices of the crystals is achieved. As such, a linearly polarized light beam launched into a side of the first crystal opposite the inclined interface plane propagates along the optical axis (z axis) of the first crystal and undergoes total reflection at the boundary plane and emerges from one or the other side of first crystal depending on the clockwise or counterclockwise direction of rotation of the interface boundary plane about an axis in the direction of incident light polarization along the x axis, located in the middle of the boundary plane.

When an electric field is applied to the first crystal, light polarization direction is manipulated in the first crystal due to Pockels activity, causing the direction of linear polarization of light to be rotated in a transverse plane with respect to light propagation direction in the first crystal. This is because the applied electric field perturbs the refractive indices and principal axes of the first crystal. The rotation of the polarization direction is adjusted so that upon light arrival at the interface plane, the polarization along a direction perpendicular to the optical axis of the second crystal is achieved. Therefore, the larger refractive index of the second crystal is felt which allows the incident light to pass through the interface plane. The perturbed crystal axes are designated as x', y' and z' wherein these new axes determine light propagation characteristics of the uniaxial crystal of trigonal 3 m symmetry along x' axis, under an applied electric field in the x direction. As shown later, the transverse y' and z' axes with respect to the direction of light propagation along x' axis, are no longer along the direction of the linear polarization direction x of the launched incident beam of light. These y' and z' axes make an angle of 45 to 50 degrees with respect to x direction, depending on the magnitude of the applied electric field (refer to FIG. 2). The two projections of the incident light polarization along x on y' and z' directions create two linearly polarized light beams propagating along x'. These two projections of the incident polarization direction along y' and z' are called "eigenmodes" with the corresponding "eigenvalues" $n_{y'}$ and $n_{z'}$ along "eigenvectors" y' and z', respectively (the "eigen" designation is adopted in books on mathematics, engineering, physics, optics, and so forth). The eigenmodes propagate along x' as if they are traveling in uniform media of refractive indices $n_{y'}$ and $n_{z'}$. Since these refractive indices of the crystal under an applied electric field are different along y' and z' directions (shown in FIG. 3), upon arrival at the interface plane, the shape and polarization direction of the combined two eigenmodes would be different from the polarization direction of the initially launched light beam along x. That is, the polarization direction of the combined two eigenmodes rotates as they propagate along x' and the polarization shape is determined by the phase difference between the eigenmodes as they arrive at the interface boundary. If the propagation distance of the two eigenmodes along x' within the first crystal, as by adjusting a length of the first crystal between the side into which the polarized light beam is launched and the center of the interface, is adjusted to give a phase difference of π, the angle of rotation of the polarization direction (initially along x) would be 90 degrees provided that the inclination of the incident light beam polarization along x and y' is 45 degrees (refer to FIG. 2). This makes the polarization direction of the combined eigenmodes to lie along the y axis of the first crystal. With relative orientation of the optical axes of the first and second crystals set to be perpendicular to each other and with the applied electric field to the first crystal, the combined two eigenmodes would feel the larger refractive index of the second crystal so that the crystal interface becomes transmissive. This leads the incident light beam to cross the crystals interface boundary and continue to propagate along x' to emerge as the Transmitted light beam from the face of second crystal 2.

In more detail, the spatial light switch of this invention switches an incident light beam of specified polarization between Reflection and Transmission states, with the switch being sensitive to the polarization direction of the linearly polarized incident light. With no electric field applied to first crystal 1, a beam of light linearly polarized in a vertical direction along x will remain vertically polarized as it passes through first crystal 1. Such a vertically polarized beam cannot pass through interface 3 to the second crystal 2, and is totally reflected within first crystal 1 because the the tip of the polarization direction points towards the optical z axis of the second crystal (along x). Under an applied electric field along the x principal axis of the first crystal 1, the molecular structure of the first crystal 1 becomes deformed, causing the first crystal 1 to assume properties of a biaxial crystal. Upon propagation of the light beam through such a deformed crystal 1, the deformed crystal rotates the polarization direction and shape of the light beam. The length of the first crystal from where the incident beam of linearly polarized (in a vertical direction x or $P_1$ in FIGS. 1A-1C) light enters the first crystal to where the beam of light encounters the interface plane is selected or adjusted so that the beam of vertical linear polarization is rotated by about 90 degrees, or to a horizontal direction along they axis in FIGS. 1A-1C, by the time the beam reaches the interface plane. At the interface plane the horizontally polarized beam along y is able to pass through the interface plane and into the second crystal, as the tip of polarization direction points towards a direction which is transverse to the optical z axis of the second crystal (along x). That is, the basis of operation of the spatial switch of the instant invention is an electric field induced polarization rotation in an anisotropic uniaxial crystal of trigonal 3 m symmetry via Pockels effect, which effect being a fast phenomenon as noted above.

Applicants' spatial switch can, therefore, operate in high speed processing of light beams having repetition rates larger than at least a few tens of GHz, and possibly up to 100 GHz. In Applicants' switch, light is made to totally reflect in the absence of an electric field using the naturally existing refractive index difference between differing crystal axes orientations. In the approach of the instant switch, where the naturally existing refractive index difference between differing crystal orientations is used to achieve light total reflection, the difficulty in the weak Pockels response to an applied electric field in creation of a refractive index boundary, as discussed above with respect to the prior art, is greatly eased. The magnitude of naturally occurring refractive index difference between two uniaxial crystals of, for example, Lithium Niobate, when two such crystals are put together with perpendicular optical axes orientations, is 2~3 orders of magnitude larger than a refractive index difference across a boundary created due to application of an electric field to a Lithium Niobate crystal. As a result, the spatial Reflection and Transmission states of the instant switch are well separated, with extinction ratios and cross-talks larger than ~50 dB. Light losses in Applicants' switch are negligibly small, which is a result of total reflection achieved at the crystals' interface.

In Applicants' spatial switch, which handles unguided light, there is no need for fabrication of light waveguides which require accurate patterning of waveguides, well controlled diffusion of Titanium into Lithium Niobate substrate using high vacuum sputtering machines and accurate delineation of electrodes. The fabrication of Applicants' switch is, therefore, much easier than guided light switches.

The polarization state of a linearly polarized light beam in one of the crystals is manipulated to achieve transmission of a light beam through an interface. In contrast, in the prior art, a crystal refractive index is left uninfluenced by Pockels effect to establish transmission of the light beam, as there is no created boundary. In prior art spatial switches, light is made to undertake total reflection at a boundary created by changing its refractive index responsive to an applied electric field to the crystal. In case of Lithium Niobate, as an example of a uniaxial crystal of trigonal 3 m symmetry, and which is used in the instant switch, the ordinary refractive index is $n_o=2.232$ whereas the extraordinary refractive index is $n_e=2.156$ at a light wavelength of 1.064 µm. The refractive index difference is $n_o-n_e=0.076$, which is much larger than the refractive index difference across a boundary created by application of an electric field to the crystal. This large refractive index difference is used in the total reflection of an incident light and, therefore, the instant switch achieves a large deflection angle of the incident light compared to the light deflection angle of the prior art switches wherein an applied electric field creates a boundary at which total reflection takes place. As the optical axis z of the first crystal and the optical axis z of the second crystal are adjusted to be perpendicular to each other, an incident light beam of polarization along x undertakes total reflection at the interface. As a result, the spatial Reflection and Transmission states of the instant switch are well separated, with extinction ratios and cross-talks larger than ~50 dB. Light losses in Applicants' switch are negligibly small, which is the result of total reflection achieved at the crystals' interface.

Figure 1B:
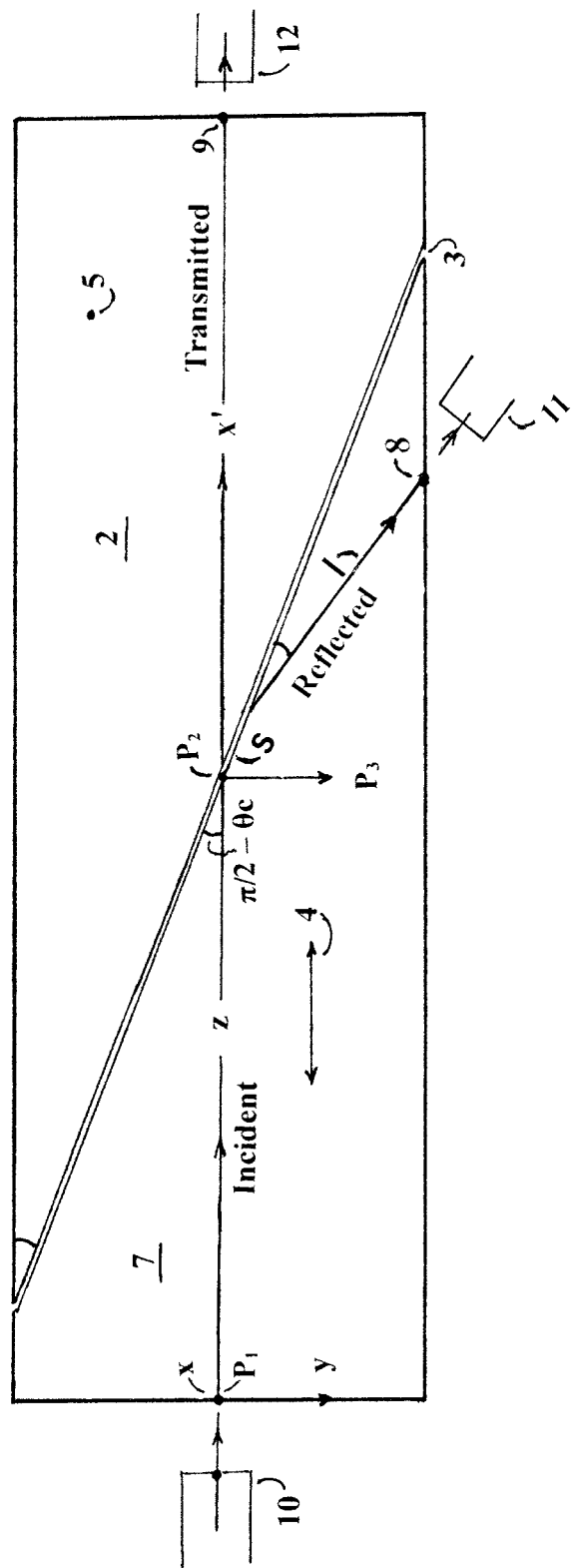
FIG. 1B is a top view of the new light switch taken along lines 1B-1B of FIG. 1A.
Figure 1C:
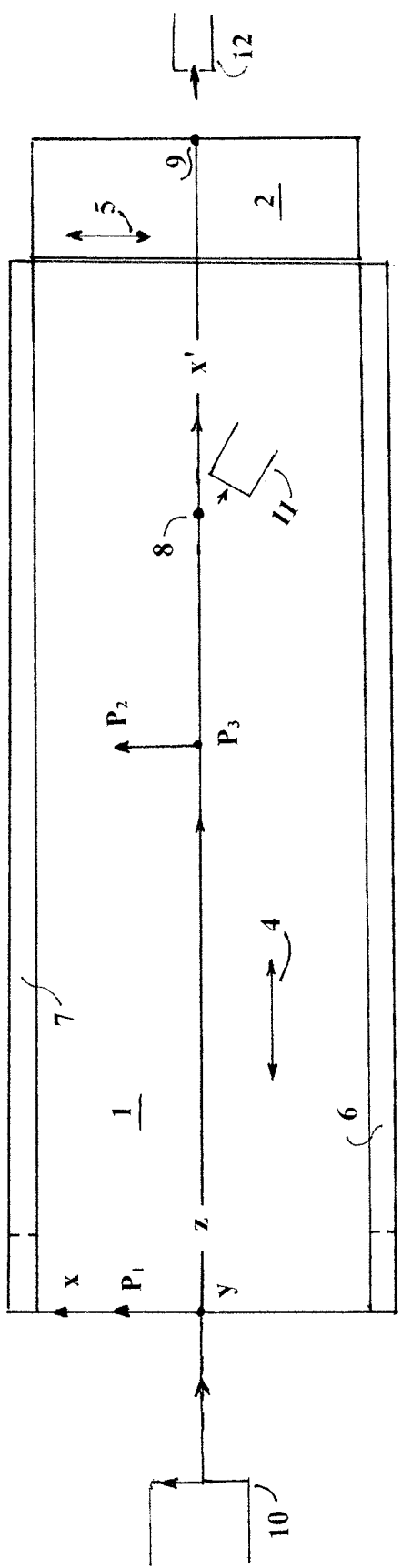
FIG. 1C is a side view of the new light switch taken along lines 1C-1C of FIG. 1A.

A pictorial view of the spatial switch of the instant invention is shown in FIG. 1A, and its top and side views taken along 1B-1B and 1C-1C, are depicted in FIGS. 1B and 1C, respectively. Two blocks of uniaxial crystals of trigonal 3 m symmetry, a first block 1 and a second block 2, are directly attached or bonded together. Where a transparent bonding agent or a glue is used, the refractive index of the glue must not disturb the refractive indices of the two crystals across the boundary plane. The technique of attaching two optical crystals together is at its maturity, as it is, for example, applied to commercially available Rochon, Senarmont, Glan-Thompson or Wollaston prisms, and should be apparent to one of ordinary skill in the art. As such, the optical axis z of crystal 1 is horizontally aligned along line 4, while the optical axis z of crystal 2 is vertically aligned along line 5. As noted earlier, this puts the optical axes of crystals 1 and 2 perpendicular to each other. A face of crystal 1 opposite the interface plane 3 is polished and flat, and normal to an incident beam of light launched into crystal 1. The interface plane 3 between these two crystals is made to be inclined at the angle $\pi/2-\theta_c$, where $\theta_c$ stands for the critical angle of the refractive indices of the uniaxial Lithium Niobate crystals along their different axes. That is, the incident light with its electric field shown by linear polarization $P_1$ along the x axis supplied by the polarized light source 10 is launched into the first crystal 1. The incident light propagates directly along z axis as an eigenmode in the medium of the first crystal's larger refractive index 2.232 while up-keeping its polarization direction. The polarization direction of the incident light along x is up-kept because the tip of the polarization vector is always towards x direction. This means that upon arrival at the interface, the linear polarization $P_2$ is still vertical along the first crystal's x direction. At the interface, the light of polarization $P_2$ is along a medium of lower refractive index 2.156 of the second crystal 2 and is, consequently, totally reflected at the interface since the light beam is incident at the angle $\pi/2-\theta_c=\pi/2-\text{Arc Sin}(2.156/2.232)=14.99$ degrees between the direction of light propagation along z and the inclined interface plane, as shown in FIG. 1A.

While the ideal critical complementary angle of 14.99 degrees is disclosed, the inclination of the interface plane 3 can be slightly smaller at 14.8 degrees wherein the light total reflection is assured. It would be even better to design the interface plane inclination set at 14.7 degrees which takes care of the approximations of ordinary and extraordinary refractive indices and the probable slight deviation of the inclination of the boundary plane from a prescribed angle. Further reduction of the interface plane inclination is not recommended because the separation between the Reflection and Transmission states of the instant light switch would degrade.

As noted earlier, the optical axes 4 and 5 of these crystals are oriented to be perpendicular to each other in order to establish the refractive index difference between the crystals axes that is responsible for total reflection. An end of the first crystal block is ground flat so that the flat plane of the end of first crystal 1 is perpendicular to the light beam that is launched into the switch. A pair of electrodes 6 and 7 are deposited on bottom and top sides, respectively, of first crystal 1. Electrodes 6 and 7 serve to establish an electric field through crystal 1 along its x axis when an electric potential is applied between electrodes 6 and 7. Light receivers 11 and 12 are used to detect the Reflected and Transmitted light of the switch, respectively.

Reflection State

The direction of a linearly polarized incident light beam propagating along z is adjusted to be along x axis of crystal 1, as shown in FIGS. 1A and 1B. With no electric field applied to electrodes 6 and 7, light of linear polarization $P_1$ with its polarization direction along x, is launched into a flat end face of crystal 1 opposite to the interface plane 3 between the two crystals, and propagates along z to interface plane 3 while its polarization direction remains unchanged. In other words, passage of a light ray along optical axis z with its polarization direction along a crystal transverse axis, does not affect polarization $P_1$ of the incident light ray. At interface 3, the direction of light polarization is shown by $P_2$ along the optical axis 5 of the second crystal 2 and, therefore, feels its smaller refractive index of 2.156. That is to say, the interface behaves as a refractive index boundary and as it is inclined at the angle $\pi/2-\theta_c$ with respect to z axis of first crystal 1, the incident light undertakes total reflection and emerges at spot 8 from a side of crystal 1, as shown in FIG. 1A, where it would be received by light receiver 11. That is, inclination of the interface plane 3 at an angle $\pi/2-\theta_c$ with respect to the direction of propagation of the incident linearly polarized light would result in total reflection in Lithium Niobate. As noted earlier, the inclination of the interface 3 is set by rotation of the interface plane about an axis (in the middle of the cross section) in the direction of incident light polarization. In an actual switch, however, in order to ensure total reflection, the angle of inclination of interface plane 3 is equal to $\pi/2-\theta_c=14.99$ or slightly less than this at 14.7 degrees as stated earlier. This is a big achievement in the switch of the instant invention, as such a large deflection of light would be impossible in prior art switches wherein a refractive index boundary is created via Pockels activity due to an applied electric field. The light emerging at spot 8 would be a combination of two components corresponding to the projections of the direction of reflected light at the interface, along y and z axes of the first crystal 1. As the refractive indices along these two directions are not equal, upon arrival at spot 8, their phases are different, resulting in an elliptically polarized light. The phase difference and relative magnitudes of these two light components at the emerging side face of crystal 1 determine the shape of the polarization ellipse of the reflected light at spot 8. It would be possible to adjust the propagation length l of the reflected light to give a phase difference equal to $\pi$ resulting in a linear polarization at spot 8. In such case, l must satisfy $$l=m\lambda/2(n_o \sin 2\theta_c + n_e \cos 2\theta_c) \quad (1)$$

with $\lambda$ denoting light wavelength and m standing for an odd integer giving l=1.064 µm at a wavelength of 1.6 µm for m=1. In order to ease handling of the switch, l may be substantially increased by adjusting the phase difference to be m$\pi$ where m is a large arbitrary odd number.

Transmission State

When an electric potential is applied to electrodes 6 and 7, forming an electric field in the electro-optic material of crystal 1, with the electric field being along x axis, the crystalline structure of crystal 1 and its principal axes become deformed. This deformation is the result of Pockels activity and changes first crystal 1 into a biaxial crystal. In determination of the deformation of such crystals under an applied electric field in the direction of x axis, the corresponding electro-optic tensor must be treated. Using the example of Lithium Niobate crystal, under a typical electric field application of 10 V/µm along x axis, the elements of the electro-optic tensor are:

$t_{11}=0.2007279$ $t_{12}=t_{21}=-0.000034$ $t_{13}=t_{31}=0.00028$ $t_{22}=0.2007279$ $t_{23}=t_{32}=0.0$ $t_{33}=0.2151307 \quad (2)$ where $r_{22}=-r_{12}=-r_{61}=3.4$ pm/V and $r_{51}=r_{42}=28$ pm/V have been used. In diagonalization of this matrix, a third order eigenvalue equation is solved numerically to get the following approximate eigenvalues:

$\lambda_1 \sim 0.215136$ $\lambda_2 \sim 0.200761$ $\lambda_3 \sim 0.200693, \quad (3)$ from which the modified refractive indices of the biaxial crystal can be determined. The corresponding normalized eigenvectors are approximately:

$x' \sim (0.0194322,-0.00004586,0.9998118)$ $y' \sim (0.678182,-0.734775,-0.0132148)$ $z' \sim (-0.734637,-0.678311,0.0142472). \quad (4)$ representing the modified crystal axes shown by x', y' and z'. The eigenvalues in Equation (2) give the following refractive indices along the 3 eigenvectors:

$n_x=2.15597$ $n_y=2.23182$ $n_z=2.23220. \quad (5)$

As seen, the first crystal being initially a uniaxial one is deformed to a biaxial crystal. Importantly, it is noted that x' is, to a very good approximation, along z axis and y', z' are rotated by about 45~50 degrees in the transverse plane. Similar results were obtained from diagonalization of the tensor in Equation (2) under varied applied electric fields up to but less than the crystal break down potential. It is, therefore, concluded that the deformed crystal shows a universal behavior under an applied electric field, as explained above. Such a behavior is not unique as it is well known that the axes of tetragonal $4^-2$ m crystals such as KDP (Potassium Di Phosphate) rotate by 45 degrees under an applied electric field along their optical z axis.

Figure 2:
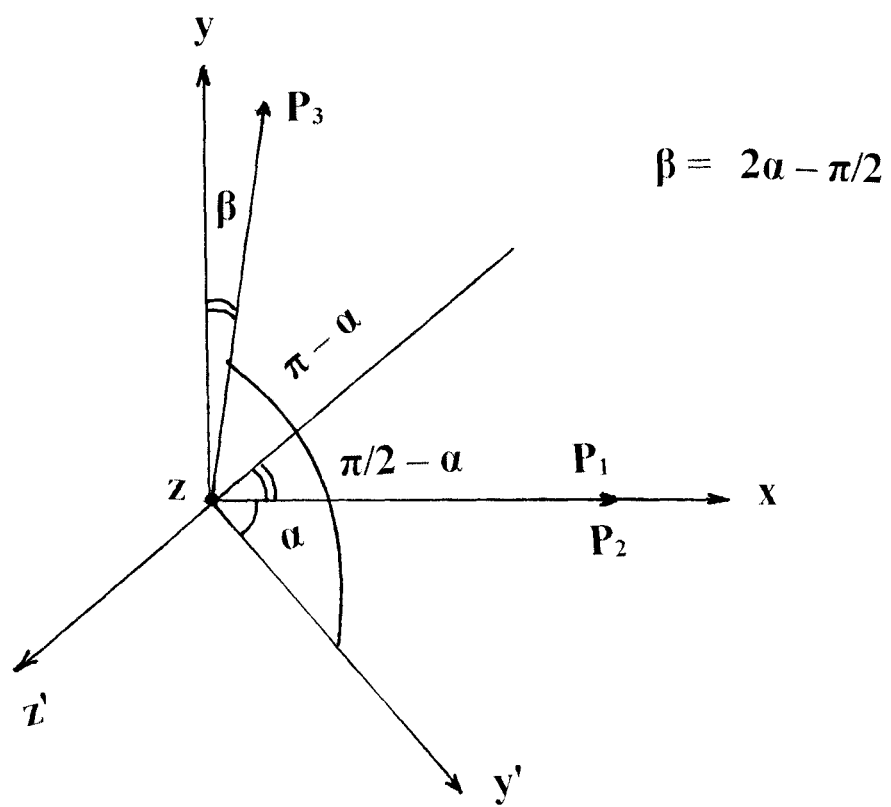
FIG. 2 illustrates the angle of eigenvectors of the deformed crystal with respect to x axis and the polarization states of the new light switch.

In Applicants' switch, and as shown in FIG. 2, when an electric field is applied along the x axis, the incident light of linear polarization $P_1$ is rotated by the deformed crystalline structure of first crystal 1 as the light propagates through crystal 1.

As a result of this rotation, upon reaching the interface plane 3, the polarization direction of light has rotated to a polarization state indicated by $P_3$ shown in FIG. 2. In other words, the incident polarized light launched into crystal 1 is rotated by about 90 degrees by the time it encounters interface plane 3. By adjusting the phase difference of the Eigen modes with refractive indices $n_{y'}$ and $n_{z'}$, it would be possible to let $P_3$ be linearly polarized and laid along y. That is, the propagation length L of incident light inside crystal 1 is adjusted such that:

$$k_0(n_{y'}-n_{z'})L=\pi. \qquad (6)$$

If it happens that the diagonalization process of electro-optic tensor in Equation (1) gives an angle of the eigenvector y' with respect to x denoted by α, at α=45 degrees, $P_3$ would be exactly along y. Otherwise, the deviation of $P_3$ from y would be:

$$\beta=2\alpha-\pi/2. \qquad (7)$$

Figure 4:
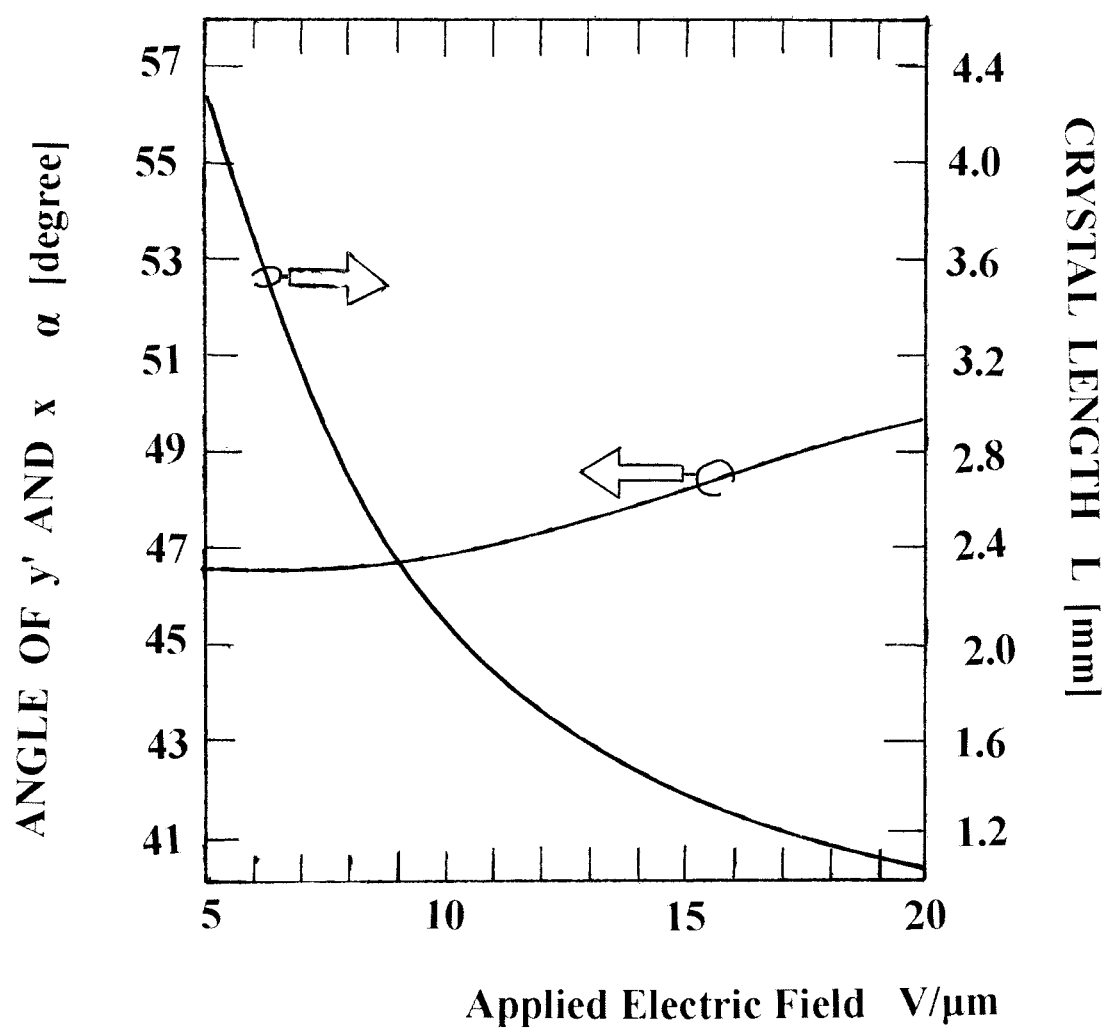
FIG. 4 is a graph illustrating rotation of a linearly polarized light in a deformed crystal and the required length of the crystal in relation to the applied electric field in our new switch.

The angle β would be a very small angle of a few degrees, as the rotation of eigenvectors shown in FIG. 4, are slightly different than 45 degrees. The significance of this deviation is described as follows.

Figure 5:
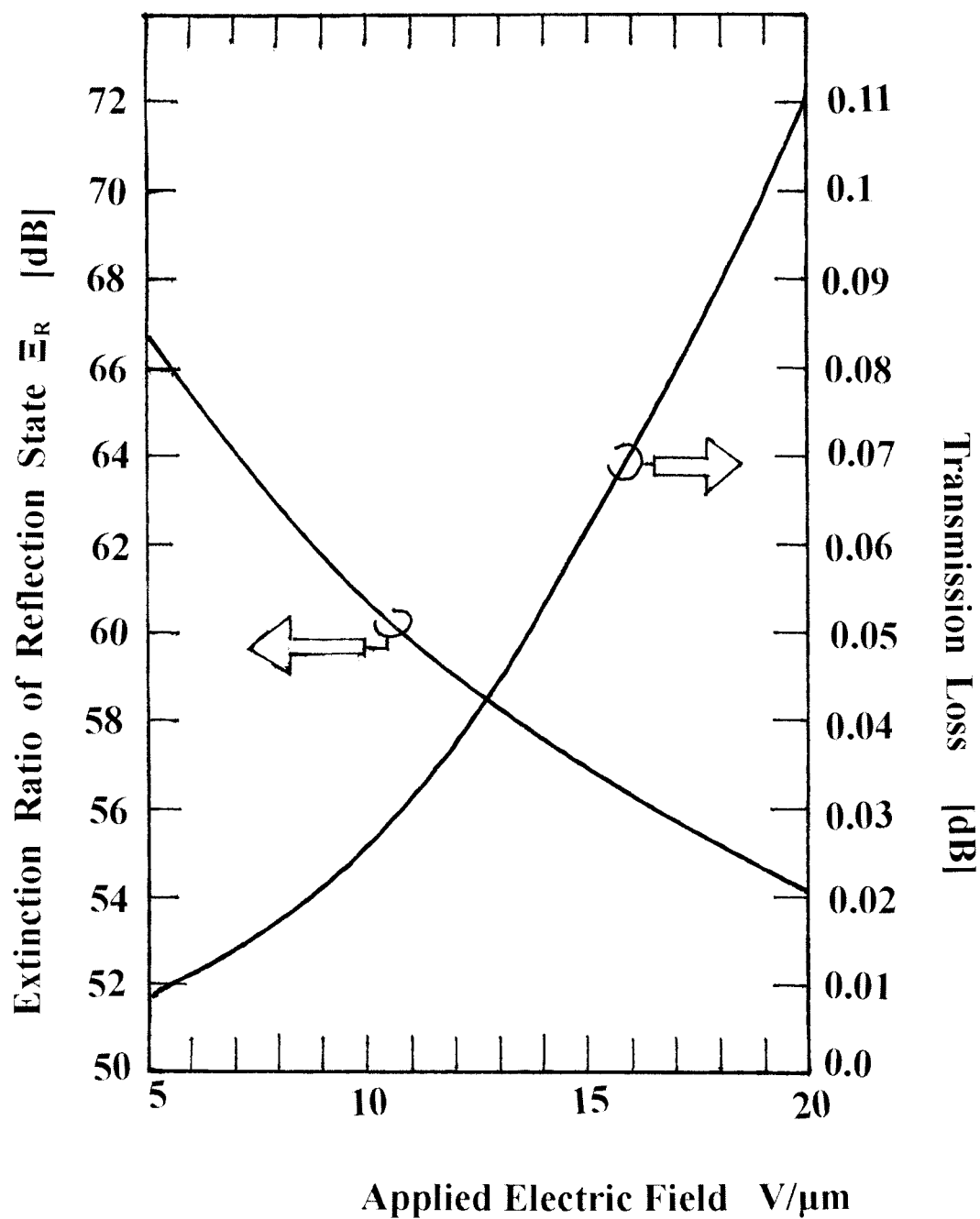
FIG. 5 illustrates the Transmission Loss and Extinction Ratio in a deformed crystal in relation to the applied electric field in our new switch.

When an electric field is applied to the crystal 1, the two eigenmodes with polarizations along y' and z' in media of refractive indices 2.23182 and 2.23220 propagate along x' and cause $P_1$ to rotate to a new direction shown by $P_3$ at the interface plane 3. Only if eigenvectors y' and z' are rotated by 45 degrees, $P_3$ would lie along y axis. Under these circumstances, half of the incident light power is carried to the interface plane in a medium of refractive index 2.23220 and the other half in a medium of refractive index 2.23182. Upon incidence on the interface, the eigenmodes are combined to give a polarization along y axis and therefore, encounter the larger refractive index 2.232 of crystal 2 wherein they face a very small boundary of refractive index difference ~0.0001. Therefore, the eigenmodes pass through the interface as Transmitted light and appear at spot 9 where it would be received by light receiver 12. If y', z' are rotated by angles different than 45 degrees, $P_3$ would not lie exactly along y with a deviation shown by the angle β of Equation (7). As seen in FIG. 4, the angle of rotation of the eigenvectors differ from 45 degrees by only a few degrees. Therefore, $P_3$ would deviate from y axis by β of only a few degrees, creating a small projection of $P_3$ along x. This small projection cannot pass through the interface and a portion of the power is reflected back into the first crystal 1. That is, there are light losses in the Transmission state which are very small as depicted in FIG. 5.

In short, the basis of operation of the instant switch is the requirement for a rotation of crystal orientations under an applied electric field by 45 degrees or very close to it. This is achieved by electric field application along x axis of the crystal, proposed newly in this Application, as shown in FIGS. 1A and 1C, with angles of rotation of the transverse axis a depicted in FIG. 4.

Switching Characteristics

Figure 3:
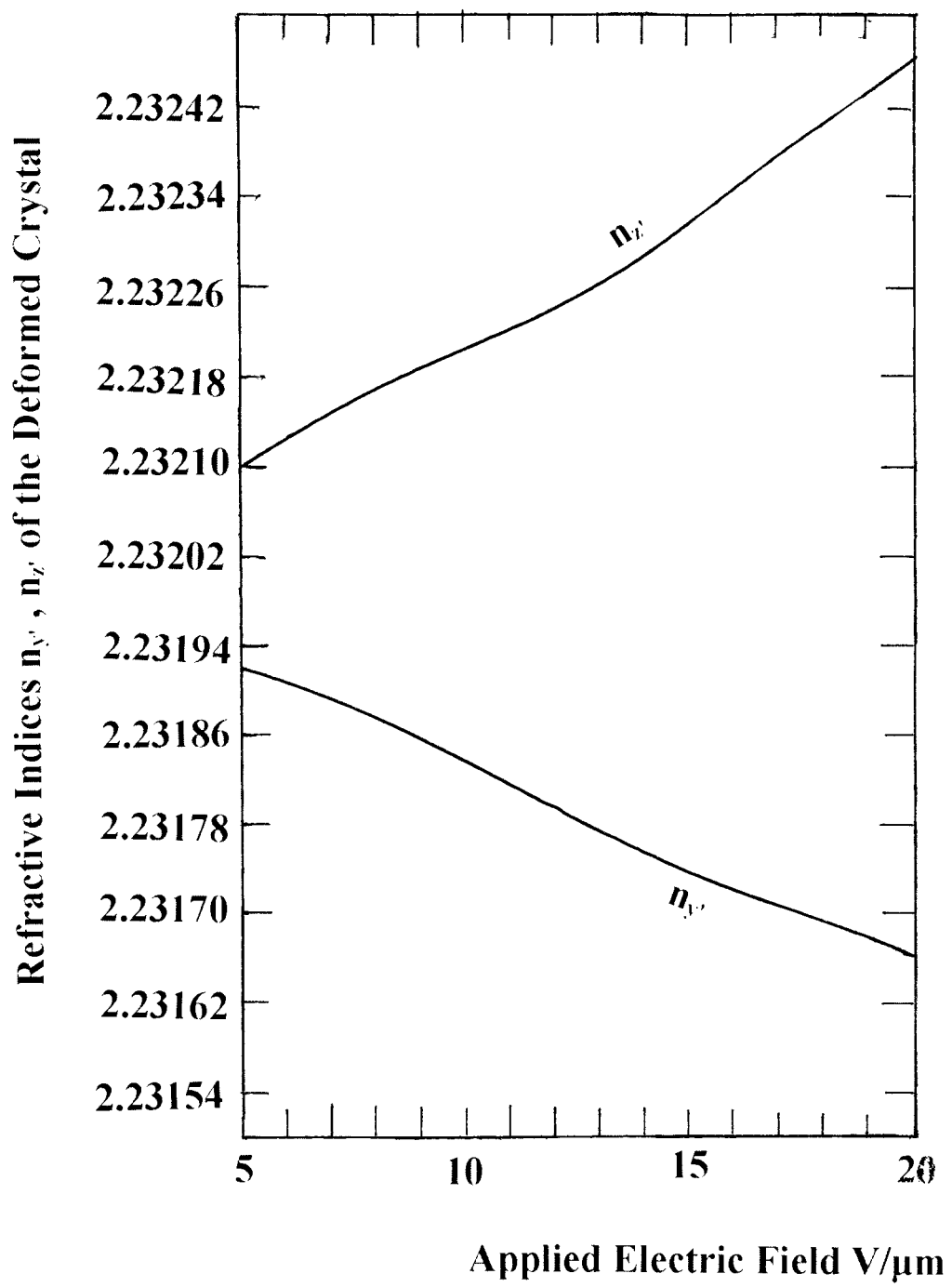
FIG. 3 illustrates the refractive indices of the deformed crystal under an applied electric field in our new switch.

Having described the switching mechanism of Applicants' light switch based on polarization management, the switching characteristics are to be determined. In FIG. 3, we illustrate the refractive indices of the eigenmodes of the deformed Lithium Niobate crystal versus the applied electric field. As seen, the difference between refractive indices of the eigenmodes increases with increasing intensity of an applied electric field. The applied electric field is increased up to 20 V/μm, which is close to but still smaller than the crystal potential break down. It is to be noted that the refractive indices change only their $4^{th}$ decimal point as the result of electric field application. The situation is typical in crystals of trigonal 3 m symmetry indicating weak Pockels effect. In FIG. 4, we illustrate the relation between angle of rotation of the principal axis a of the deformed Lithium Niobate first crystal and the applied electric field. As seen, the angle of rotation is close to but slightly different than 45 degrees. That is, this small difference results in the slight deviation of polarization $P_3$ from the y axis, which in turn causes light losses in the Transmission state. In FIG. 4, the required length of first crystal L in achieving phase difference between the eigenmodes, is also shown against the applied electric field. As seen in FIG. 3, the difference between refractive indices $n_{y'}$ and $n_{z'}$ of the eigenmodes increases with increasing applied electric field. Therefore, the required propagation length L to achieve phase-difference accumulation of π in Equation 6 would sharply decrease. In FIG. 5, the Extinction Ratio of Reflection state and Transmission Losses in our switch are depicted versus the applied electric field. The Extinction Ratio of Reflection state $\Xi_{R_R}$ defined as the ratio of light power of Reflection State at no applied electric field to the power at applied electric field V/d, is shown in dB. As seen, quite large Extinction Ratios in excess of 50 dB are achievable even at large applied electric fields. The decreasing behavior of $\Xi_{R_R}$ with applied electric field can be explained in terms of increasing light power at Reflection state due to larger difference of refractive indices of the eigenmodes, causing more reflected power under applied electric field. The Transmission losses of our spatial light switch is also shown in FIG. 5. Transmission losses are generated due to the slight alignment deviation of $P_3$ from the y axis. Further, as the applied electric field is increased, the refractive indices of the eigenmodes of the deformed first crystal 1 deviate further from the ordinary refractive index 2.232 of second crystal 2. However, Transmission Losses remain quite acceptably small even at large applied electric fields. As to the Extinction Ratio of the Transmission state defined as the transmitted power ratio at applied electric field to the transmitted power at no applied electric field, turns to be infinitely large. This is due to light total reflection achieved by selection of the inclination of crystal interface plane 3 as stated earlier. In actual switches, due to fabrication tolerances, approximations involved, the accuracy of inclination of the interface plane, etc., the Extinction Ratio of the Transmission State $\Xi_{T_T}$ would remain finite, but quite large values in excess of 50 dB are expectable. With no electric field applied, the incident light undertakes total reflection at the crystals' interface plane 3 and, therefore, suffers no loss. That is to say, the Reflection state is lossless. The Cross-talk χ of the instant switch is defined as the ratio of Transmission power to that of Reflection power both at electric field applied. With an applied electric field, almost all light is transmitted and the Cross-talk is, to a good approximation, equal to $1/\rho_x$ where $\rho_x$ is the power reflection coefficient. Therefore, the Cross-talk χ equals to the Extinction Ratio of Reflection State $\Xi_{R_R}$ and as seen in FIG. 5, quite large values in excess of 50 dB are achievable. The Cross-talk χ plays an important role in switching characteristics and the switch finds practical applications only if the Cross-talk χ is sufficiently large, say better than 30 dB.

Switch Size

The length of light propagation in first crystal 1 must satisfy the phase-difference accumulation of Equation 6 to allow for rotation of the light polarization vector by about 90 degrees. As seen in FIG. 4, the requirement results in a first crystal 1 length L of a few millimeters. L is a prescribed length required in achieving phase difference π in Equation (6) as depicted in FIG. 4. Due to fabrication tolerances, L may deviate slightly from a prescribed value. However, it would always be possible to compensate for such tolerances by adjusting the applied electric field strength affecting the difference $n_y-n_z$ of the biaxial crystal. This makes fabrication of the instant switch an easy task, as elaborated later. The length of crystal 2 is arbitrary, and the total length of the light switch may come to be several millimeters. The switch width W is mostly determined by the phase difference of reflected light components along y and z directions affecting the ellipticity of the reflected light polarization at spot 8. It would be possible to adjust the propagation length of the reflected light received at spot 8 to give a phase difference of π. Under such circumstances, the reflected light polarization at spot 8 becomes linear with l determined from Equation (1) to be 1.064 μm. As the light absorption losses in Lithium Niobate are acceptably small, the switch width W, for the ease of handling purposes and achieving good separation between light spots 8 and 9, can further be increased. This can be achieved by letting l to satisfy phase difference of 3π, 5π, 7π, and so on. The switch size H is mostly determined by the beam diameter d. The light beam size should be less than H to avoid light losses to metallic electrodes. If necessary, $SiO_2$ buffer layers may be introduced between the electrodes, to protect light from direct contact with metals. The height H, therefore, comes to be slightly larger than the beam diameter d. For d 10 μm, the applied voltage turns to be 50 Volts for an electric field of V/d=5 V/μm. The incident beam supplied by light source 10 is finite in size. The effect of total reflection of a finite size incident beam is manifested by the Goos-Haenschen shift s shown in FIGS. 1A and 1B. The shift s is a few light wavelengths long and in accounting for such a shift, the position of light receiver 11 must be adjusted as shown in FIGS. 1A-1C.

Fabrication Process

The switch of the instant invention can easily be fabricated as it is comprised only of two crystal blocks of anisotropic trigonal 3 m symmetry and a pair of electrodes. As an example of such crystals, Lithium Niobate for which processing techniques are well known to those familiar with the art, is chosen as the type of crystal 1 and crystal 2 of the Applicants' switch. Other uniaxial crystals of trigonal 3 m symmetry, such as Lithium Tantalate, etc., may also be used. The fabrication steps include preparation of two blocks of crystals with end faces cut at the prescribed angle $\pi/2-\theta_c \sim 14.7$ degrees as shown in FIGS. 1A-B. The end faces must be free of wavelength-size corrugations and if necessary, be well ground and polished using abrasive granules to avoid roughness. Gold or silver electrodes 6 and 7 are patterned and delineated on top and bottom surfaces of crystal 1. The length L of crystal 1 must be adjusted to satisfy the phase difference relationship in Equation (6) so that the linearly polarized light is rotated 90 degrees with an applied electric field. It is preferable to check the 90 degree light polarization rotation by adjusting the applied electric field strength before binding the two crystals together. By electric field application to crystal 1, it must be verified if polarization vector $P_3$ lies along or close to y direction. If necessary, crystal 1 can further be ground to adjust length L to satisfy Equation (6). Anyway, as stated earlier, it would be possible to compensate for deviations of length L by adjusting the applied electric field strength. The two crystal blocks are bonded together by customarily used glues such that the refractive indices at boundary 3 are not disturbed. The corresponding techniques have reached maturity as commercially available Glan-Thompson, Rochon, Senarmont or Wollaston prisms all use two blocks of crystals attached together. However, for very smooth and roughness-free interfaces, it would be preferable to attach firmly the two blocks of crystals directly together which improves the power handling capability of the switch.

Drive Requirements

The polarization vector of the incident light upon crystal 1 of the instant switch supplied by light source 10 must specifically lie along x axis. This is a stringent requirement and the incident light must accurately be adjusted for such an alignment. Among several possibilities, a Lamipole, Glan-Thompson prism, or Panda fibers, for example, can be used to let only light of a specific polarization be launched into the switch.

Our invention, its use, fabrication method and working principals have all been presented. It should be apparent to those familiar and skilled in the appropriate arts that incidental changes might be made that fairly fall within the scope of the following appended claims, wherein we claim:

The invention claimed is:

1. An optical spatial light switch comprising:
    a first block of a uniaxial crystal of trigonal 3 m symmetry, hereinafter referred to as "first block", the first block exhibiting refractive index and crystal principal axes change responsive to application of an electric field, the first block having an x axis that is vertical through the first block, a y axis that is laterally orthogonal to the x axis and a z axis that is longitudinally orthogonal to the x and y axes, the z axis also lying along an optical axis of the first block,
    a second block of a uniaxial crystal of trigonal 3 m symmetry, hereinafter referred to as "second block", the second block firmly pressed or transparently bonded to the first block wherein an interface plane between the first block and the second block is inclined with respect to the z axis at about a critical complementary angle of the ordinary and extraordinary refractive indices of the first block, with the optical z axis of the first block oriented to be perpendicular to an optical z axis of the second block,
    a first electrode on a top surface of the first block,
    a second electrode on a bottom surface of the first block, the first electrode and the second electrode selectively providing an electric field along an x direction of the first block, altering light propagation inside the first block,
    a source of selectively switchable electric power connected to the first electrode and the second electrode, for selectively providing an electric field between the first electrode and the second electrode,
    a light beam source for generating a linearly polarized beam of light polarized along the x axis of the first block, the linearly polarized beam of light launched normally into the first uniaxial crystal, whereby with no said electric field applied between the first electrode and the second electrode, the linearly polarized beam of light polarized along the x axis launched into the first block and propagating along the optical axis of the first block is totally reflected at the interface plane to emerge at a first spot, and with the electric field applied between the first electrode and the second electrode, the linearly polarized beam of light is transmitted through the interface plane and into the second block and emerges at a second spot.

2. The light spatial switch as set forth in claim 1 wherein the interface plane between the first block and the second block is inclined at a critical complementary angle of the ordinary and the extraordinary refractive indices of the first block and second block being about $\pi/2-\theta_c$ with respect to the direction of propagation of the linearly polarized incident light in the x direction along the z axis of the first crystal.

3. The light spatial switch as set forth in claim 2 wherein Lithium Niobate crystals of trigonal 3 m symmetry are used as the first block and the second block, the angle $\pi/2-\theta_c$ is about 14.7 degrees.

4. The light spatial switch as set forth in claim 3 wherein the first block is configured so that the electric field along the x axis causes the first block to become a biaxial crystal by altering the refractive indices and principal axes of the first block.

5. The light spatial switch as set forth in claim 4 wherein the z axis of the first block under an applied said electric field lies approximately along an x' direction of a deformed said biaxial crystal.

6. The light spatial switch as set forth in claim 3 wherein the source of selectively switchable electrical power is configured to provide the electric field at an intensity of about 5~20 V/μm in the first block.

7. A light spatial switch as set forth in claim 1 wherein the interface plane is inclined at a critical complementary angle corresponding to refractive indices of the first uniaxial crystal with respect to a direction of light propagation in the first uniaxial crystal, whereby total reflection at the interface plane causes no loss of the linearly polarized beam of light to occur in the Reflection State.

8. The light spatial switch as set forth in claim 7 wherein the first electrode and the second electrode are configured to produce the electric field in the first block along the x axis and perpendicular to a yz plane so that light propagation direction inside the first block along the z axis is undisturbed.

9. The light spatial switch as set forth in claim 1 wherein the light beam source is configured to provide a linearly polarized beam of light polarized along the x axis of the first block.

10. The light spatial switch as set forth in claim 9 wherein the linearly polarized beam of light is rotated by the first block to become perpendicular to an optical axis of the second block at the interface plane when the first block is conformed into the biaxial crystal by the electric field along the x direction.

11. The light spatial switch as set forth in claim 10 wherein a length of the first block is selected so that the linearly polarized beam of light along the x axis is rotated 90 degrees to lie along the y axis at the interface plane, enabling the linearly polarized beam of light to enter the second block and emerge at the second spot.

* * * * *